Nov. 16, 1965  R. R. DIEKHOFF  3,217,758
PIN FORMING AND INSERTION HEAD
Filed Sept. 27, 1963  4 Sheets-Sheet 3

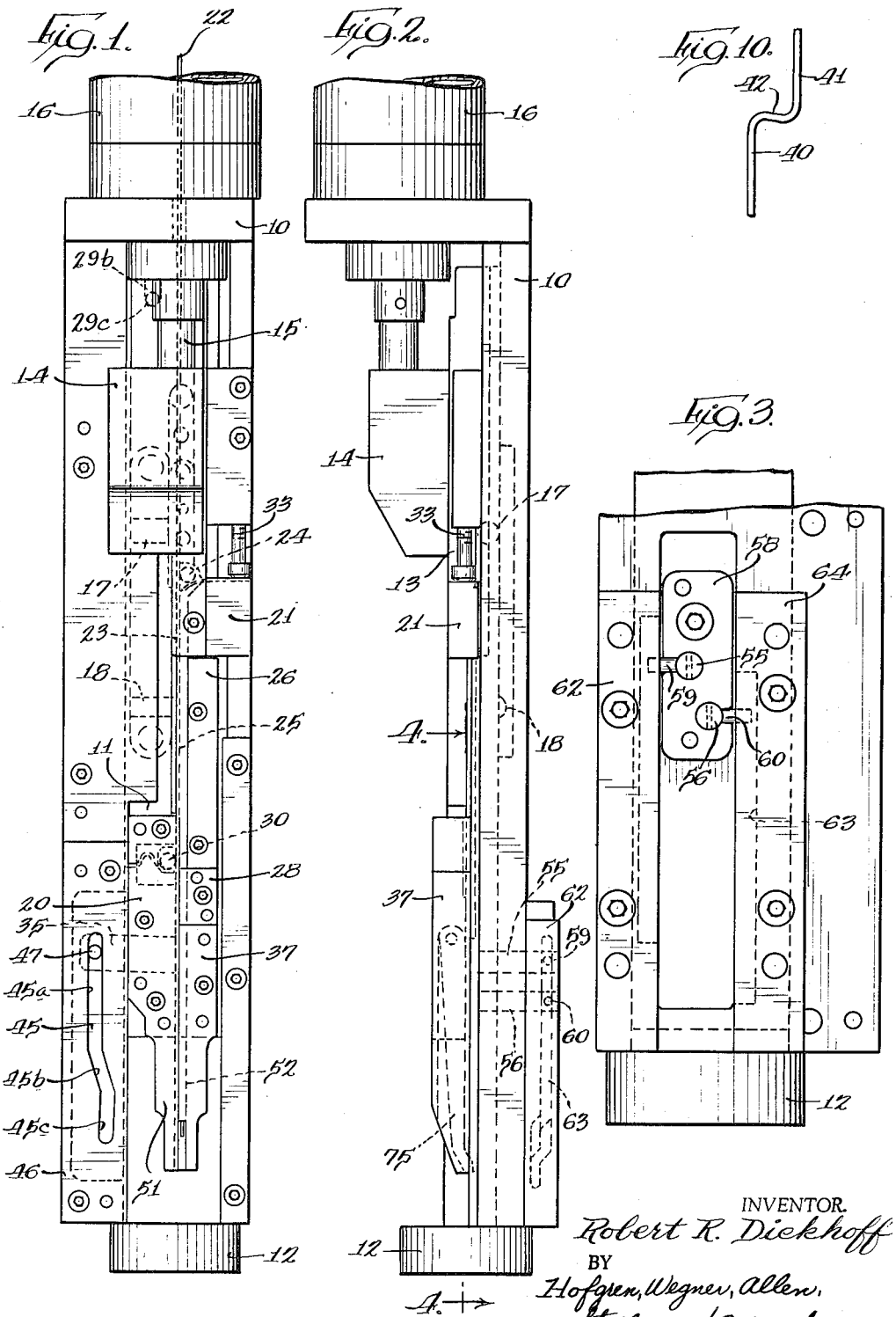

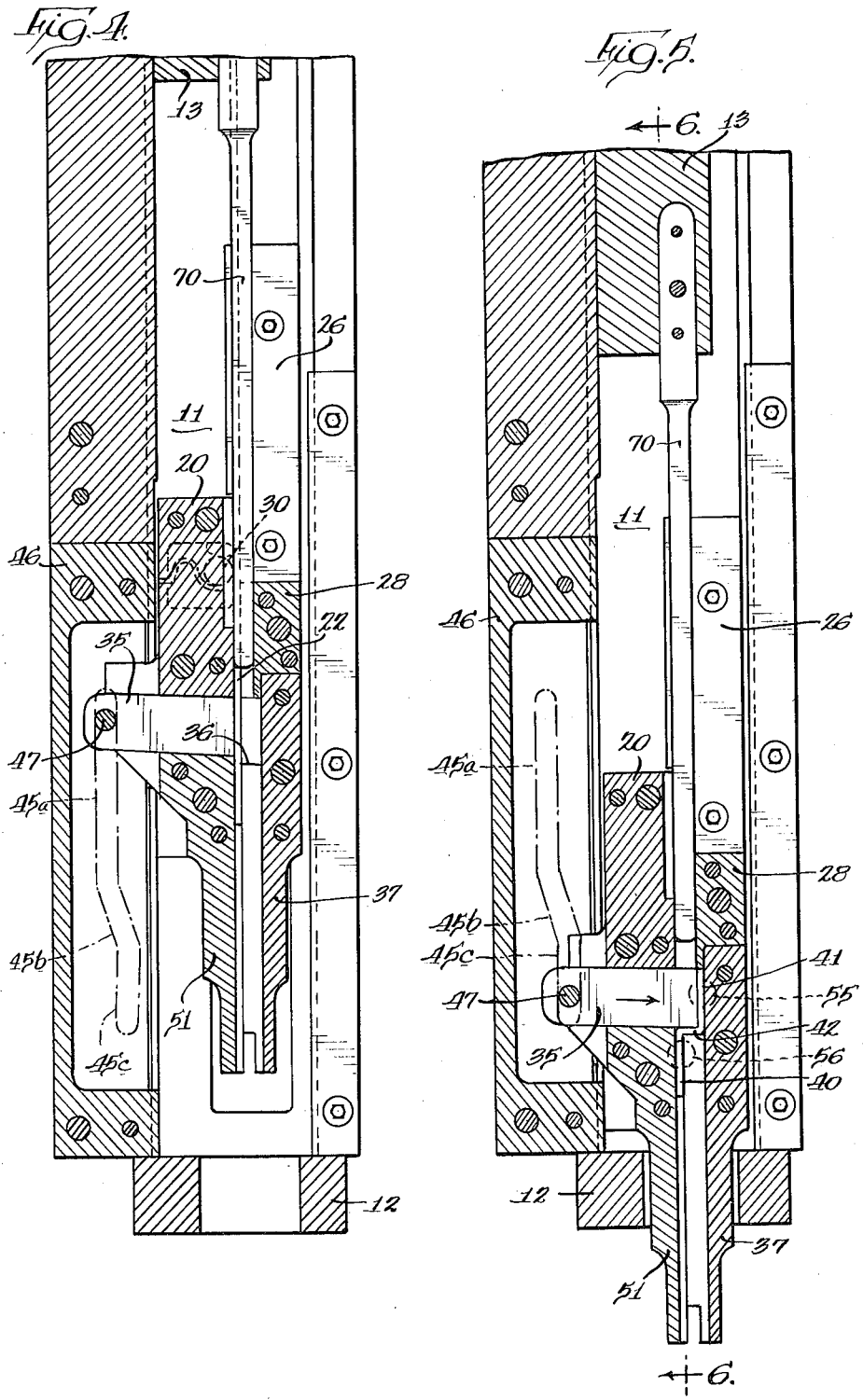

United States Patent Office 3,217,758
Patented Nov. 16, 1965

3,217,758
PIN FORMING AND INSERTION HEAD
Robert R. Diekhoff, Mount Prospect, Ill., assignor to Warwick Electronics Inc., a corporation of Delaware
Filed Sept. 27, 1963, Ser. No. 312,165
8 Claims. (Cl. 140—71)

This invention relates to component forming and inserting apparatus and more particularly to apparatus for forming and inserting offset terminal pins.

An object of this invention is to provide new and improved component forming and inserting apparatus for offset terminal pins.

Another object of the invention is to provide a component forming and inserting apparatus in which mechanism moving in a continuous advancing stroke cuts off a section of wire from a length thereof to form a pin, places an offset in said pin intermediate the ends thereof and ejects the pin from the apparatus.

Another object of the invention is to provide an apparatus for forming and inserting a component, such as an offset terminal pin, in which the apparatus has a frame with a main slide movable on the frame and an inner slide movably mounted on the main slide, said main slide having a forming station and carrying movable means at the forming station responsive to movement of the main slide in advancing movement for cutting off a section of wire from a length thereof to form the pin and forming an offset in said pin, additional means at the forming station responsive to movement of the main slide in said advancing stroke for shifting the formed pin transversely of the advancing movement of the main slide to align the pin with an ejection channel in the main slide, and means associated with the inner slide and movable therewith relative to the main slide for moving the formed pin through the ejection channel and ejecting the pin from said channel.

Still another object of the invention is to provide an apparatus as defined in the preceding paragraph in which the section of wire, once cut from the length thereof, is positively handled by the structure referred to so as to avoid the likelihood of a formed pin changing its oriented position and jamming the apparatus.

Further objects and advantages will become apparent from the following detailed description taken in connection with the accompanying drawings in which:

FIG. 1 is a front elevational view of the apparatus with the parts shown in retracted position;

FIG. 2 is a side elevational view of the apparatus shown in FIG. 1;

FIG. 3 is a fragmentary, rear elevational view, on an enlarged scale, showing the lower part of the apparatus;

FIG. 4 is a fragmentary, vertical section, on an enlarged scale, taken generally along the line 4—4 in FIG. 2 and showing the mechanism positioned in its retracted position and with a length of wire positioned to form the next terminal pin;

FIG. 5 is a view, similar to FIG. 4, showing the mechanism positioned after cutting-off of the wire section and forming a pin with the formed pin aligned with the ejection channel;

FIG. 10 is a detail view of a formed offset pin.

Figure 6:
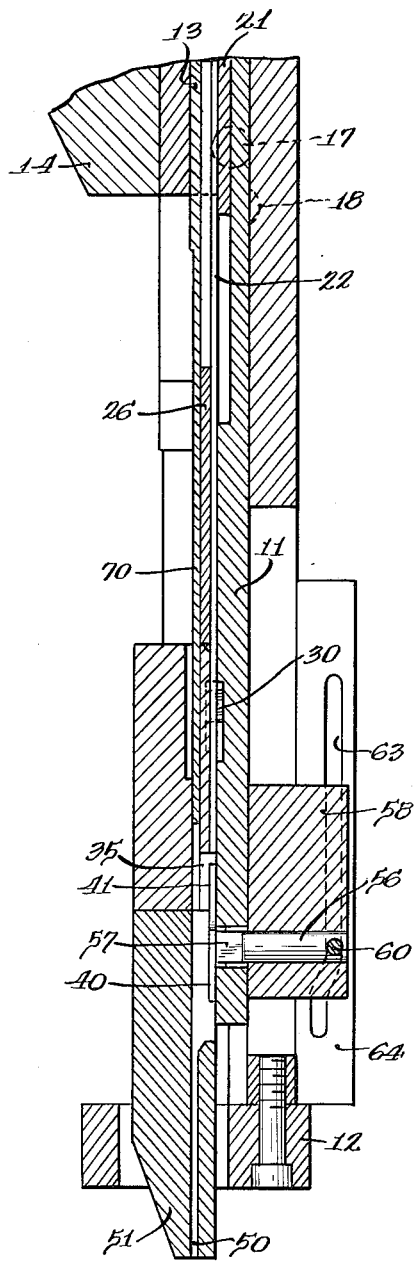
FIG. 6 is a vertical section, taken generally along the line 6—6 in FIG. 5 but with the parts positioned prior to shift of a formed pin into alignment with the ejection channel.

While this invention is susceptible of embodiment in many different forms, there is shown in the drawings and will herein be described in detail an embodiment of the invention, with the understanding that the present disclosure is to be considered as an exemplification of the principles of the invention and is not intended to limit the invention to the embodiment illustrated. The scope of the invention will be pointed out in the appended claims.

The apparatus disclosed herein is utilized in forming terminal pins, such as used in circuit boards and often referred to as "Keller" pins, and which additionally have an offset intermediate the ends thereof. These pins extend upwardly, as well as beneath the circuit board, and provide a terminal on which wire can be wrapped. This apparatus embodies several basic components, as shown in FIGS. 1, 2 and 6, including a frame 10 supporting a main slide 11 movably mounted on the frame for an advancing stroke toward a base 12 attached to the frame and a return stroke to a retracted position as shown in FIGS. 1, 2 and 4. The main slide 11 mounts an inner slide 13, as shown in FIG. 6, which is movably mounted thereon and the inner slide is connected to a connecting member 14 which threadably receives the rod 15 of a double-acting pneumatic cylinder supported at the top of the frame 10.

Figure 7:
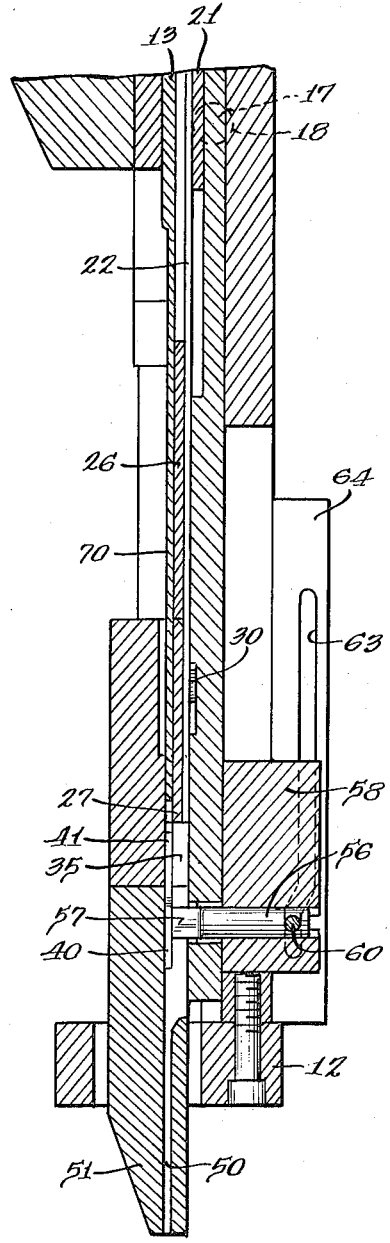
FIG. 7 is a view similar to FIG. 6, but showing the terminal pin pushers in advanced position for aligning the pin with the ejection channel.

The main slide 11 and inner slide 13 are moved together in an advancing stroke by the cylinder 16, due to a clutch connection provided by a ball 17, shown in FIGS. 6 and 7, and which, in a conventional manner, is disposed within an opening in the main slide 11 and engageable in a recess in the inner slide 13. Thus, as viewed in FIG. 6, the two slides are clutched together until the main slide 11 moves down to have block 58 engage a stop on base 12 (FIG. 7) and to alignment with a notch, or recess, 18 in the frame which permits the ball 17 to move rearwardly and out of engagement with the inner slide 13, as shown in FIG. 7.

Figure 8:
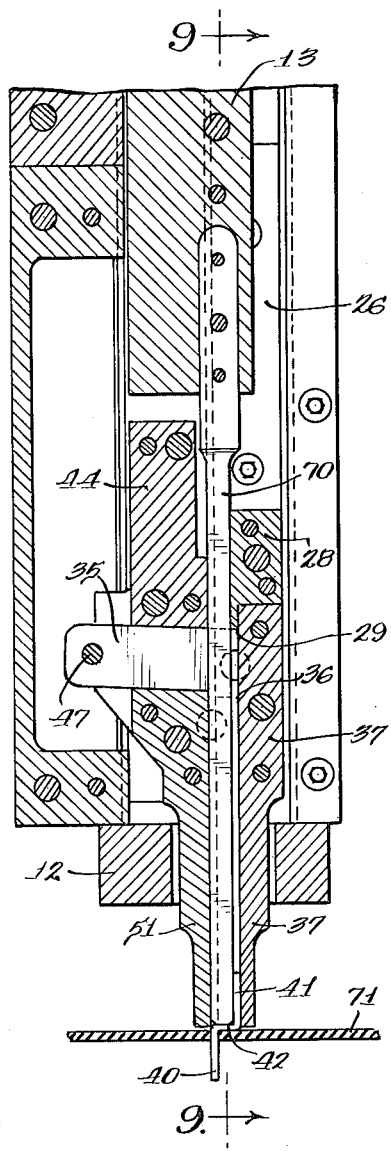
FIG. 8 is a vertical section, similar to that shown in FIG. 5, with the parts in fully advanced position for ejecting a terminal pin.

The main slide 11 carries with it a number of operative mechanisms including a block 20 (FIG. 1) forming part of wire feed mechanism. A movable member 21 movable on the main slide 11 forms another part of the wire feeding mechanism. The wire indicated at 22 and as shown in FIG. 1 passes down alongside the motor cylinder 16 through an opening in the frame 10 to pass through a channel 23 in the member 21 which guides the wire past a one-way clutch ball 24 movably mounted in the member 21. The wire continues through a passage 25 on the underside of a wire guide 26 fixed to the main slide 11. The wire guide 26 terminates at an end 27 adjacent which a block 28 is mounted having a wire cutoff edge 29 (FIG. 8).

In a wire feeding cycle, assuming that a formed pin has just been placed in a circuit board, the inner slide 13 and main slide 11 are in their extended position and as they start to rise under the action of the cylinder 16 the inner slide 13 moves upwardly until the ball 17 again clutches the main slide to the inner slide and a slot 29a engages a pin 29b on the main slide and this then begins upward movement of the block 20 carrying a one-way clutch ball 30 engagable with the wire. The upward movement of the block causes the ball 30 to freely travel over the wire. The ball 24 carried in the member 21 is positioned to prevent retrograde movement of the wire. The member 21 is loosely mounted for movement on the main slide 11 and is limited in its upward movement by engagement with an adjustable stop screw 33. As the main slide moves upwardly, a forming member 35 carried on the main slide, and more fully described subsequently, pushes against the end of the wire to elevate the wire along with the main slide. The ball member 24 on the member 21 positively locks onto the wire and moves upwardly with the wire until the block hits the adjustable screw 33. Shortly before this time, the former 35 is withdrawn out of the way of the wire end with wire guide 26 and roller 30 having sufficient friction engagement with the wire to carry the wire upwardly with the main slide. As soon as the member 21 hits the stop 33, the wire cannot move upwardly any further and continued movement of the block 20 carries the ball 30 up along the wire to provide a predetermined length of wire in a forming station on the main slide for forming the next pin. On the next downstroke of the slide, the ball 30 causes the predetermined length of wire to move downwardly for forming of the pin.

The forming station includes the cutoff member 29 and forming member 35 in the form of a blade carried on the main slide along with an anvil 36 carried on a first nosepiece 37 also movable with the main slide. Of these mechanisms, the former member 35 is mounted for movement transversely to the path of main slide movement and, as shown at FIG. 8, moves along a slight downwardly inclined path to coact with a slight incline in the anvil member 36 to place a slight downward incline on the intermediate part of the offset pin. A pin is shown in FIG. 10 having a lower leg 40, an upper leg 41 and the intermediate downwardly inclined offset 42. The former member 35 is movably mounted in a block 44 which is secured to the main slide 11. The former member has its lateral movement controlled by a cam slot 45 provided in a member 46 secured to the frame in order to remain stationary relative to slide movement. A cam follower pin 47 is connected to the former member 35 and rides in the cam slot.

The cam slot 45 has an upper section 45a which is generally parallel to the path of slide movement, an inclined section 45b which causes the former member to shift across the wire path to coact with the cut off member 29 and cut the upper end of the pin from the continuous length of wire and a lower section 45c which functions to draw the former member 35 back slightly after the offset is formed in the pin to free the pin from tight engagement with the former member. Additionally, the intermediate slope 45b in addition to causing cut off moves the wire against the anvil member 36 to form the offset 42 in the pin. As previously pointed out, on the upstroke of the slide, the former member remains extended until the follower pin 47 reaches the upper end of the intermediate slot section 45b to aid in moving the wire upwardly during a wire feed cycle. This position in the operation is shown in FIG. 6 in which the pin has been formed. At the time of forming the pin, the pin is to the right, as viewed in FIG. 6, or generally to the rear of an ejection or guide channel defined by a slot 50 in a second nosepiece 51 with the remainder of the ejection channel being defined by a channel 52 in the first nosepiece 37.

In order to shift the formed pin from the position shown in FIG. 6 to that shown in FIG. 7, a pair of pusher rods 55 and 56, as shown in FIG. 5, are movably mounted on the main side for movement along a path extending from front to rear of the apparatus. Each of these rods are basically of a circular cross section, with rectangular forward ends, as shown at 57 for the pusher 56 in FIGS. 6 and 7. The pusher rods are carried movably in a block 58 secured to the rear of the main slide with each of the rods having laterally projecting cam follower pins 59 and 60, respectively, as shown in FIG. 3.

The cam follower pin 59 coacts with a cam slot 61 in a block 62 secured to the frame, while the cam follower pin 60 coacts with a cam slot 63 in a block 64, secured to the main frame. Each of these has a forwardly inclined section with the inclined sections on the two cam slots being at different elevations to coact with the different elevations of the pusher rods, so that the pusher rods are moved forwardly after formation of the pin to shift the pin into alignment with the ejection channel.

Figure 9:
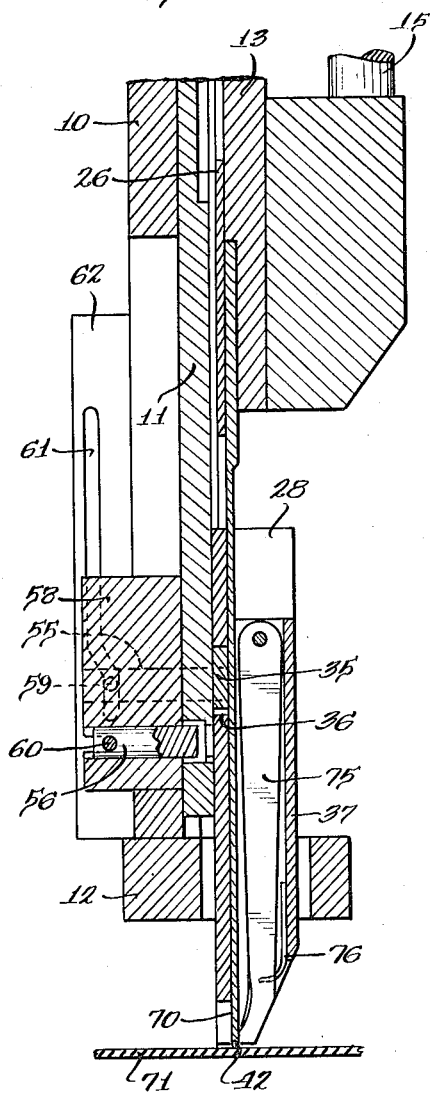
FIG. 9 is a vertical section, taken generally along the line 9—9 in FIG. 8.

At the time of forward shift of the formed pin to alignment with the ejection channel, the main slide 11 has substantially terminated its movement and the clutch ball 17 frees the inner slide 13 from the main slide so that a slender elongate pusher 70 secured to the main slide and in alignment with the ejection channel may move downwardly from the position shown in FIG. 7 to that shown in FIGS. 8 and 9 wherein the formed pin is ejected substantially from the ejection channel and placed in a circuit board as shown at 71 in FIGS. 8 and 9.

For more positive control of the formed pin as it is moved along the ejection channel, the nosepiece 37 carries a pivoted finger 75 urged against the pin by a spring 76 and yieldable as the formed pin is moved to the ejection position.

In operation, with the slides in their upper position, a length of the wire extends to a level beneath the stationary knife on block 28 secured to the main slide 11. Actuation of the motor cylinder 16 moves both the main slide 11 and inner slide 13 downwardly with the wire being carried therewith due to the one-way ball member 30 mounted in the block 20 attached to the main slide. This movement continues until the forming location is reached, at which time the cam slot section 45b becomes operative to advance the former 35 transversely to the path of main slide movement with a corner of the former coacting with the stationary knife on block 28 to cut off a length of wire from the main length. Further transverse movement of the former member forms an offset in the pin about the anvil 36 on the nosepiece 37 with the formed pin shown in FIG. 5 and the former being slightly retracted, as shown in that view. Additional downward movement of the main slide occurs to have the push rods 55 and 56 function as controlled by the cam slots 63 and 61 to shift the formed pin into a position of alignment with the ejection channel. When this is accomplished, the main slide movement ceases with the nosepieces of the main slide immediately adjacent a circuit board 71 by disengagement thereof from the inner slide by shift of the ball clutch 17 and the inner slide continues to move downwardly to have the pusher 70 move along the ejection channel from the position shown in FIGS. 5 and 7 to the position shown in FIGS. 8 and 9. This effects insertion of the formed pin into the circuit board. Upon the return stroke of the slides, the inner slide moves upwardly until the main slide is clutched thereto by reengagement of the ball clutch 17 and during this upward cycle the main slide travels over a predetermined length of wire which is to form the next pin.

I claim:

1. Component forming and inserting apparatus comprising, a frame, a forming station, means at said station for cutting a section of wire from a length thereof and forming an offset in said section including an anvil, means movable transversely of the frame for shifting said offset section off the anvil, and means movable longitudinally of the frame for ejecting said shifted section from the frame.

2. Component forming and inserting apparatus comprising, a frame, a main slide movable on said frame, an inner slide mounted on said main slide, means operatively connected to said inner slide for moving said inner slide longitudinally of the frame, means for releasably connecting said slides together for simultaneous movement, means on said main slide for guiding a continuous length of wire and for holding said wire for movement with said main slide in an advancing stroke thereof, means for positioning a length of wire at a forming station on said main slide on a retracting stroke of the main slide, means carried on said main slide at said forming station and operative in an advancing stroke of the main slide for cutting a section of wire from said length and for forming an offset intermediate the ends of said section, means movably mounted on said main slide and operative at the end of the advancing stroke of the main slide for shifting said wire section to an ejecting position in alignment with a guide channel in said main slide, and a pusher on said inner slide movable through said guide channel for ejecting said section from the main slide.

3. Component forming and inserting apparatus comprising, a frame, a main slide movable on said frame, an inner slide mounted on said main slide, means operatively connected to said inner slide for moving said inner slide longitudinally of the frame, means for releasably connecting said slides together for simultaneous movement, means on said main slide for guiding a continuous length of wire and for holding said wire for movement with said main slide in an advancing stroke thereof, means for positioning a length of wire at a forming station on said main slide on a retracting stroke of the main slide, a cutting and forming blade mounted on said main slide for movement transverse to the path of the advancing stroke of the main slide, a cutting block and anvil, and cam means operative in the advancing stroke of the main slide and coacting with the blade for advancing the blade toward the cutting block to cut a section of wire and subsequently form an offset in the wire by advance of the blade beyond the anvil.

4. Component forming and inserting apparatus comprising, a frame, a main slide movable on said frame, an inner slide mounted on said main slide, means operatively connected to said inner slide for moving said inner slide longitudinally of the frame, means for releasably connecting said slides together for simultaneous movement, means on said main slide for guiding a continuous length of wire and for holding said wire for movement with said main slide in an advancing stroke thereof, means for positioning a length of wire at a forming station on said main slide on a retracting stroke of the main slide, means carried on said main slide at said forming station and operative in an advancing stroke of the main slide for cutting a section of wire from said length and for forming an offset intermediate the ends of said section, a pair of pusher members on said main slide at the forming station movable transversely to the path of the main slide, and cam means on said frame coacting with said pusher members during the final movement of the main slide in the advancing stroke for shifting said pusher members into engagement with the offset wire section and moving said section into alignment with an ejection channel in said main slide, and a pusher member carried by the inner slide movable along said ejection channel for ejecting said section while the main slide is stationary.

5. An apparatus as defined in claim 4 in which a finger is yieldably positioned in said ejection channel for yieldably resisting advance of a wire section.

6. Component forming and inserting apparatus comprising, a frame, a main slide movable on said frame, a movable inner slide, means for positioning a length of wire at a forming station on said main slide, means carried on said main slide at said forming station and operative in an advancing stroke of the main slide for cutting a section of wire from said length and for forming an offset intermediate the ends of said section, a pair of pusher members on said main slide at the forming station movable transversely to the path of the main slide, and means on said frame coacting with said pusher members during the final movement of the main slide in the advancing stroke for shifting said pusher members into engagement with the offset wire section and moving said section into alignment with an ejection channel in said main slide, and a pusher member carried by the inner slide movable along said ejection channel for ejecting said section while the main slide is stationary.

7. Component forming and inserting apparatus comprising, a frame, a main slide movable on said frame, an inner slide mounted on said main slide, means operatively connected to said inner slide for moving said inner slide longitudinally of the frame, means for releasably connecting said slides together for simultaneous movement, means on said main slide for guiding a continuous length of wire and for holding said wire for movement with said main slide in an advancing stroke thereof, means for positioning a length of wire at a forming station on said main slide on a retracting stroke of the main slide, means carried on said main slide at said forming station and operative in an advancing stroke of the main slide for cutting a section of wire from said length and for forming an offset intermediate the ends of said section including a cutting and forming blade movable transversely to the path of movement of the main slide and a cutting block and anvil, a pair of pusher members on said main slide at the forming station movable transversely to the path of the main slide, and cam means on said frame coacting with said pusher members during the final movement of the main slide in the advancing stroke for shifting said pusher members into engagement with the offset wire section and moving said section into alignment with an ejection channel in said main slide, and a pusher member carried by the inner slide movable along said ejection channel for ejecting said section while the main slide is stationary.

8. Component forming and inserting apparatus comprising, a frame, a main slide movable on said frame, a movable inner slide, means for positioning a length of wire at a forming station on said main slide, means carried on said main slide at said forming station and operative in an advancing stroke of the main slide for cutting a section of wire from said length and for forming an offset intermediate the ends of said section, means movably mounted on said main slide and operative at the end of the advancing stroke of the main slide for shifting said wire section to an ejecting position in alignment with a guide channel in said main slide, and a pusher on said inner slide movable through said guide channel for ejecting said section from the main slide while the main slide is stationary.

References Cited by the Examiner
UNITED STATES PATENTS

| | | | |
|---|---|---|---|
| 3,059,321 | 10/1962 | Pityo | 140—93 |
| 3,079,957 | 3/1963 | Weiss | 140—71 |
| 3,128,648 | 4/1964 | Clagett | 140—93 |
| 3,147,779 | 9/1964 | Brown | 140—71 |

CHARLES W. LANHAM, *Primary Examiner.*